United States Patent
Hotz et al.

[11] Patent Number: 5,904,903
[45] Date of Patent: May 18, 1999

[54] ELECTRICALLY HEATABLE PRIMARY CATALYTIC CONVERTER

[75] Inventors: Uwe Hotz, Muggensturm; Hagen Fischer, Karlsruhe, both of Germany

[73] Assignee: Heraeus Electro-Nite International N.V., Houthalen, Belgium

[21] Appl. No.: 08/817,033

[22] PCT Filed: Oct. 6, 1995

[86] PCT No.: PCT/EP95/03954

§ 371 Date: Apr. 4, 1997

§ 102(e) Date: Apr. 4, 1997

[87] PCT Pub. No.: WO96/11329

PCT Pub. Date: Apr. 18, 1996

[30] Foreign Application Priority Data

Oct. 6, 1994 [DE] Germany .................. 44 35 784

[51] Int. Cl.⁶ .................................................. F01N 3/10
[52] U.S. Cl. .................... 422/174; 422/119; 60/300; 219/541; 219/552; 174/102 P; 174/118
[58] Field of Search .................. 422/173–174, 422/199, 180, 222; 60/300; 219/541, 552, 501, 205; 174/102 P, 118

[56] References Cited

U.S. PATENT DOCUMENTS

| | | | |
|---|---|---|---|
| 2,334,756 | 11/1943 | Eichinger | 174/102 P |
| 4,300,381 | 11/1981 | Sugiuchi et al. | 219/69.12 |
| 4,413,169 | 11/1983 | Cameron | 219/53 |
| 4,475,029 | 10/1984 | Yoshida et al. | 219/553 |
| 4,572,940 | 2/1986 | Tijs | 219/86.25 |
| 4,998,341 | 3/1991 | Jones | 29/828 |
| 5,238,650 | 8/1993 | Sheller et al. | 422/174 |

FOREIGN PATENT DOCUMENTS 5-202736  8/1993  Japan .

*Primary Examiner*—Hien Tran
*Attorney, Agent, or Firm*—Antonelli, Terry, Stout & Kraus, LLP

[57] ABSTRACT

An electrically heatable starter catalytic converter (5) has a metallic housing (6) in which is arranged the actual catalyst (7) exposed to the exhaust gas flow, an electric resistance heating (8) and an electric connection line (10) that enters the housing (6) through an opening (9). The invention is characterized in that the electric connection line (10) is a metal-clad cable with at least one inner lead (11) electrically insulated from the metal cladding by a mineral (13). The inner lead (11) frictionally engages the electric resistance heating (8), and the metal cladding (12) enters the metallic housing (6) through the opening (9) and is welded or soldered to the edge of the opening (9) in a gas-tight manner.

12 Claims, 1 Drawing Sheet

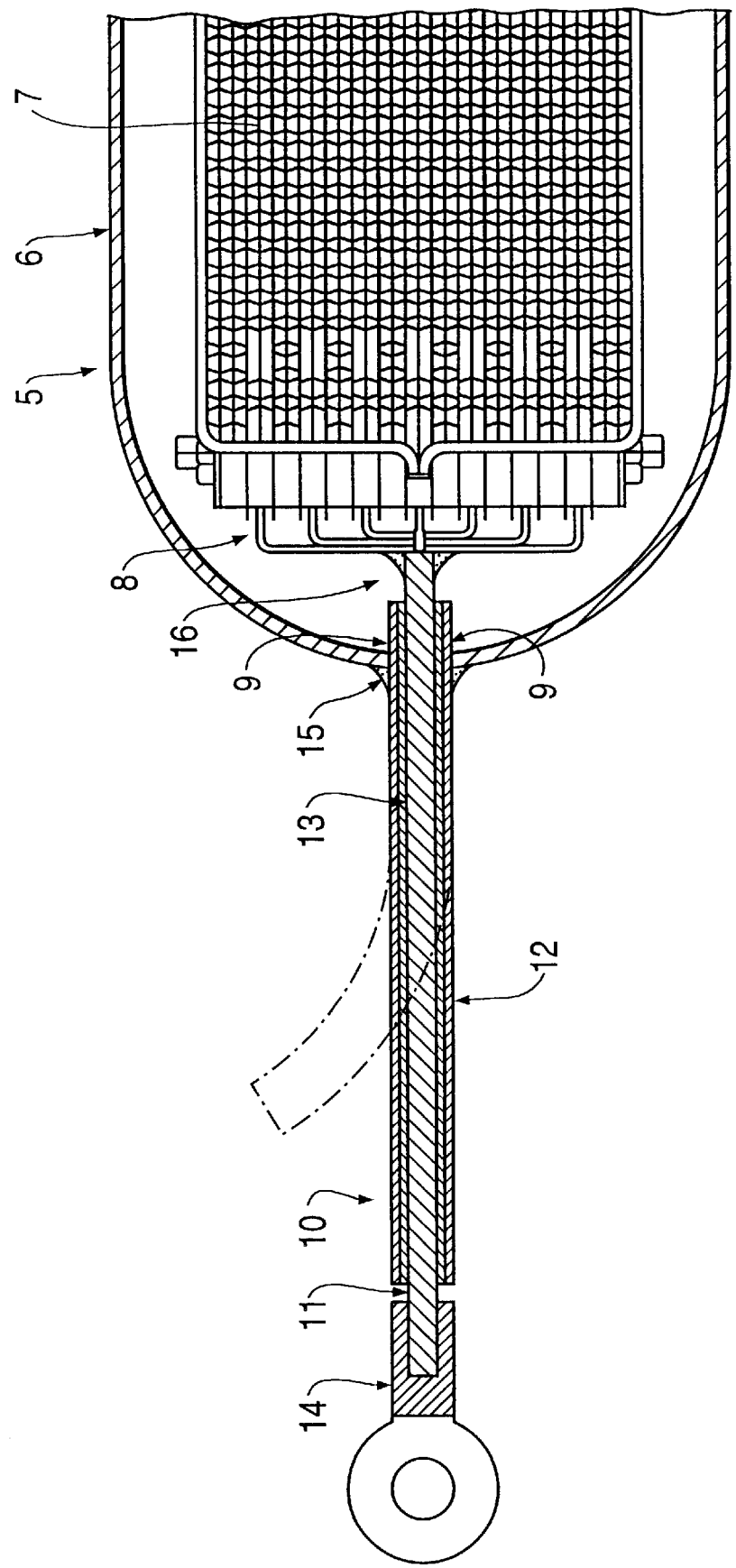

ELECTRICALLY HEATABLE PRIMARY CATALYTIC CONVERTER

BACKGROUND OF THE INVENTION

The invention relates to an electrically heatable primary catalytic converter having a metal housing, a catalyst provided in the housing and exposed to an exhaust gas stream, an electrical resistive heater and a connecting lead fed to the heater from the outside through an opening.

Primary catalytic converters of this type are known in a plurality of embodiments and have proved their value. However, it is disadvantageous that the electrical connecting lead is a problem. Thus, plastic-coated connecting leads are unsuited for a moisture- and gas-type connection at high temperatures and in corrosive media, as for example in the exhaust from internal combustion engines. In addition, clamp or screw connections made of conventional conducting materials, such as copper, nickel, or other alloys, cannot be used since they cannot ensure permanently reliable electrical connections because of the oxidation and/or corrosion of the interfaces. In particular, high contact resistances develop. On the one hand, if precious metals or precious metal coatings are used on the conducting materials, high costs result. On the other hand, the temperature in the connecting area of the primary catalytic converter can only be reduced by costly design measures. In view of the limited space for accommodation of such primary catalytic converters, functional disadvantages must be taken into account as a result of such measures, for example limitation of the exhaust gas stream to areas remote from the contacts.

SUMMARY OF THE INVENTION

Hence, the goal of the invention is to provide a permanently reliable electrical connection. This goal is achieved in an electrical primary catalytic converter providing the electrical connecting lead as a metal jacket lead with at least one internal conductor insulated therefrom electrically by a mineral. The metal jacket lead is guided through the opening into the metal housing and connected therewith in a gas-tight manner by welding or soldering along the edge of the opening.

Thus, for example, a metal jacketed lead with at least one internal conductor insulated from it electrically by means of a mineral is used as the electrical connecting lead. The internal conductor is positively connected with the electrical resistance heater, for example, by welding or soldering (Wolfram (tungsten) inert gas (WIG) laser or spot welding). The metal jacketed lead is also fed through an opening in the metal housing and connected with the latter in a gas-tight manner by welding or soldering along the edge of the opening. Thus assurance is provided in simple fashion that firstly the gas tightness of the housing is guaranteed and secondly the connecting lead can be connected reliably in a permanent fashion despite being located in a hot and corrosive environment.

Further improvements on the invention are possible. In particular, a screw or clamp connection to the internal conductor can be welded, soldered, or crimped at the cold end of the metal jacketed lead, namely the lead located outside the housing. In addition, an electrically insulating sheath can be mounted over the connection at the cold end as moisture protection. Preferably, a mineral electrical insulating layer is located between the metal jacket and the internal conductor, said layer consisting for example of MgO and/or $Al_2O_3$, quartz, or glass. The internal conductor can be made of an alloy containing copper and/or aluminum and/or iron and/or nickel. Preferably, the aluminum content of the internal conductor is 3–10 weight percent, the iron content is up to 4 weight percent, and the nickel content is up to 5 weight percent. Preferably, both ends of the metal jacketed lead are sealed tightly to protect against loss of insulation as well as the penetration of gases, moisture, and contamination that reduce the insulation resistance. Synthetic resins are particularly suitable for this purpose at the cold end, while ceramic adhesives are used at the hot or cold end, especially adhesives based on aluminum oxide or magnesium oxide. In addition, ceramic molded bodies can be used, glued or glazed to the metal jacket and internal conductor.

The metal jacket conductors according to the invention make it possible to adjust the temperature gradients over the length and adjust the rest of the design in such fashion that a temperature that does not exceed 250° C. prevails at their cold ends. Consequently, an economical plastic insulated copper cable can be used for this application. The embrittlement of the insulation of the connecting lead and the influence of high temperature and vibration in the prior art no longer occur. In addition, the metal jacketed lead permits a dimensionally stable bending contour of the connecting lead without additional retaining elements.

The metal jacketed lead used according to the invention can be used not only on primary catalytic converters, but also at all locations where there is a hot and corrosive environment.

BRIEF DESCRIPTION OF THE DRAWINGS

One embodiment of the invention will now be described with reference to the drawing in greater detail, said drawing showing a schematic cross section through a primary catalytic converter.

DETAILED DESCRIPTION OF THE PREFERRED EMBODIMENT

The primary catalytic converter, designated as a whole by 5, has a housing 6 as well as the catalyst itself 7 located inside, provided with an electrical resistance heater, represented schematically by 8. An electrical connecting lead 10 is fed into housing 6 through an opening 9.

This electrical connecting lead 10 is designed as a metal jacketed lead with at least one electrically insulated internal conductor 11 insulated by a mineral 13, for example MgO or $Al_2O_3$. In the embodiment shown, a single internal conductor 11 is provided, concentric with respect to outer metal jacket 12. The electrically insulating mineral 13 is provided therebetween. The metal jacketed lead 10 is passed through opening 9 into the interior of housing 6 and connected along the edge of opening 9 by welding 15 so that a gas-tight feedthrough is obtained. Internal conductor 11 is likewise connected with electrical resistance heater 8 by a welded connection 16.

At the end of the metal jacketed lead 10 that is located outside the housing 6, i.e. the cold end, a screw or clamp connection designated schematically as a whole by 14 is provided. Both ends are sealed by a ceramic adhesive, not shown, so that the mineral insulator is protected against moisture, gas, and contamination.

We claim:

1. Electrically heatable primary catalytic converter comprising a metal housing, a catalyst located in the metal housing and exposed to an exhaust stream, an electrical resistance heater provided in the metal housing, and an electrical connecting lead fed to the electrical resistance heater from the outside of the housing through an opening, wherein the electrical connecting lead is a metal jacket lead having at least one internal conductor and a metal jacket surrounding the at least one internal conductor over a major portion of the length of the at least one internal conductor and insulated therefrom electrically by a mineral, the internal conductor being positively connected with the electrical resistance heater, and the metal jacket being guided through the opening into the metal housing and connected therewith in a gas-tight manner by welding or soldering along an edge of the opening.

2. Primary catalytic converter according to claim 1, wherein at least an end of the metal jacketed lead located in the housing is sealed.

3. Primary catalytic converter according to claim 2, wherein the end of the metal jacketed lead located in the housing is sealed by ceramic adhesive.

4. Primary catalytic converter according to claim 2, wherein at least the end of metal jacketed lead located in the housing is sealed by a molded body, said molded body being connected with the metal jacket and the internal conductor by gluing or glazing.

5. Primary catalytic converter according to claim 4, wherein the molded body is a ceramic molded body.

6. Primary catalytic converter according to claim 1, wherein the internal conductor is positively connected with the electrical resistance heater by welding or brazing.

7. Primary catalytic converter according to claim 1, wherein the internal conductor consists of an alloy containing copper and/or aluminum and/or iron and/or nickel.

8. Primary catalytic converter according to claim 1, wherein the internal conductor consists of a chromium-nickel high-grade steel or high-temperature nickel-based alloy.

9. Primary catalytic converter according to claim 1, wherein an aluminum content of the internal conductor is 3–10 weight percent, an iron content is up to 4 weight percent, and an nickel content is up to 5 weight percent.

10. Primary catalytic converter according to claim 3, wherein the end of the metal jacketed lead located in the housing is sealed by ceramic adhesive comprising $Al_2O_3$ or MgO.

11. Primary catalytic converter according to claim 1, wherein the metal jacketed lead is so constructed as to permit a dimensionally stable bending contour of the metal jacketed lead without additional retaining elements.

12. Primary catalytic converter according to claim 1, wherein the metal jacketed lead has a length permitting a cold end of the at least one internal conductor opposite an end located in the metal housing to have a temperature during use not exceeding 250° C.

* * * * *